United States Patent [19]

Mancini

[11] 4,318,628
[45] Mar. 9, 1982

[54] CONNECTING DEVICE FOR CONSTRUCTION PANELS

[75] Inventor: Paolo E. Mancini, Rome, Italy

[73] Assignee: International W Systems S.r.l., Italy

[21] Appl. No.: 80,905

[22] Filed: Oct. 1, 1979

[30] Foreign Application Priority Data

Oct. 16, 1978 [IT] Italy ................ 51526 A/78

[51] Int. Cl.³ .................. F16B 9/00; F16B 15/00
[52] U.S. Cl. .................. 403/231; 403/232.1; 403/405; 411/461
[58] Field of Search ............ 403/231, 230, 232.1, 403/191, 405, 406; 85/11, 13; 411/461–468

[56] References Cited

U.S. PATENT DOCUMENTS

| 379,688 | 3/1888 | Dennis | 85/13 X |
|---|---|---|---|
| 3,907,445 | 9/1975 | Wendt | 403/232.1 |

FOREIGN PATENT DOCUMENTS

| 15789/70 | 12/1971 | Australia | 403/231 |
|---|---|---|---|
| 529293 | 6/1954 | Belgium | 85/13 |
| 816749 | 10/1951 | Fed. Rep. of Germany | 403/231 |
| 2428586 | 1/1976 | Fed. Rep. of Germany | 403/230 |
| 929932 | 7/1947 | France | 403/230 |
| 185694 | 9/1922 | United Kingdom | 403/232.1 |

OTHER PUBLICATIONS

TECO Products, Structural Wood Fasteners, 5530 Wisconsin Ave., Washington, D.C. 20015, Jun. 1972, p. 6.

Primary Examiner—James Kee Chi
Attorney, Agent, or Firm—Beveridge, DeGrandi & Kline

[57] ABSTRACT

An assembling and connecting device consisting of a combination of one or more joint seats in which are inserted construction elements to be connected with one another and which have one or more locking projections intended to penetrate into the construction elements so as to firmly lock them in the position determined by the seats.

2 Claims, 6 Drawing Figures

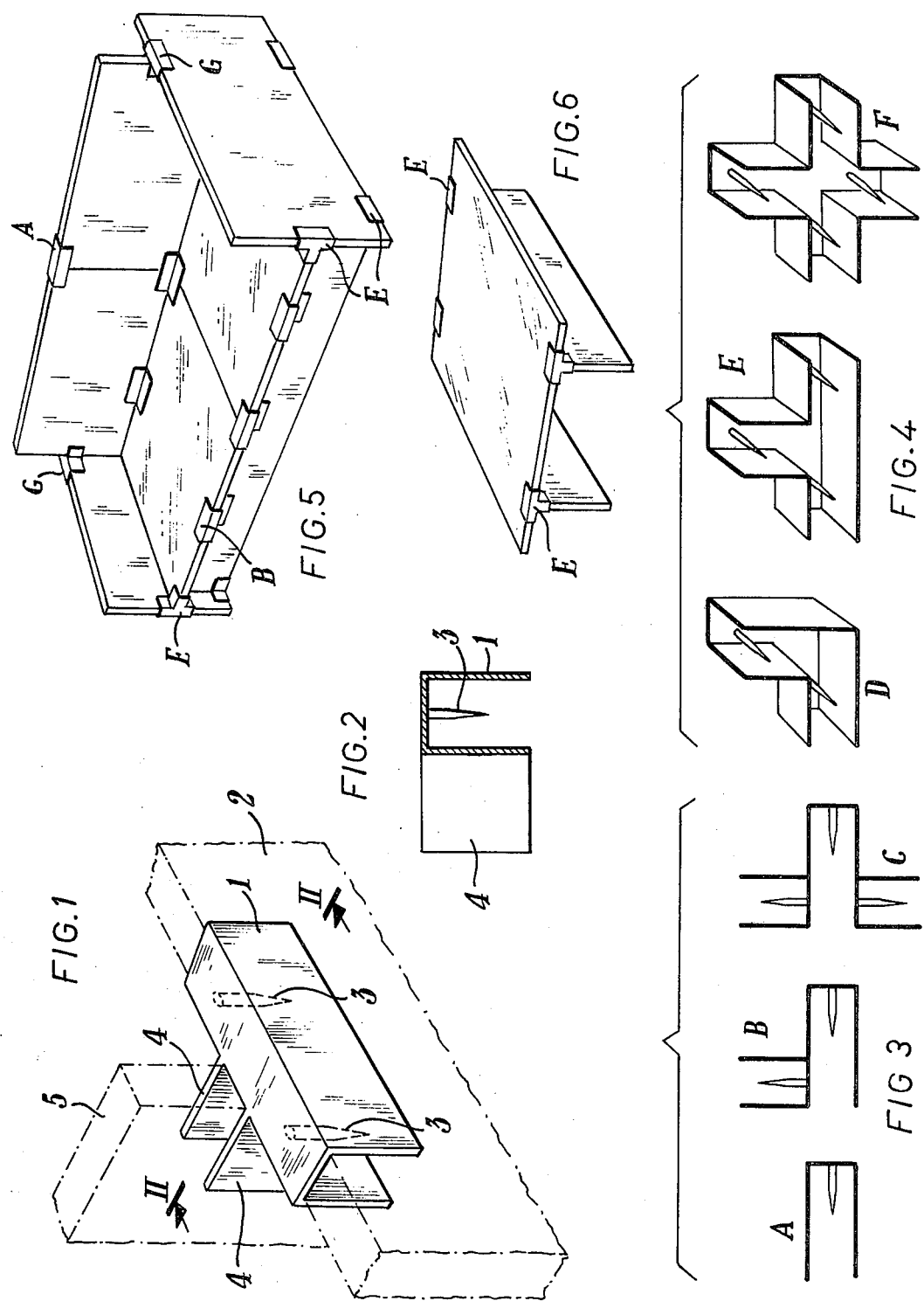

CONNECTING DEVICE FOR CONSTRUCTION PANELS

The present invention refers to a device for assembling and connecting to one another construction elements in general, and particularly panels for furniture and like.

An object of the invention is to provide a manufacture of said kind, adapted to allow a quick and exact positioning, assemblage and connection of two or more construction elements without employing particular tools and, above all, without using conventional connection systems such as nails, screws, glues, groove-and-tongue joints, mastics and so on.

According to the invention a device is provided which consists of a combination of one or more joint seats, into which construction elements to be connected with one another are inserted and which have one or more locking projections arranged within said seats and intended to penetrate into said construction elements for firmly fixing them in the position established by said joint seats.

Said joint seats consist of U-shaped elements, and said locking projections consist of cone shaped pins arranged within said seats and forming one body therewith.

The invention will be now disclosed with reference to attached drawings, which show an illustrative and not limitative, preferred embodiment of the invention itself and in which:

FIG. 1 shows an isometric projection of the device according to the invention.

FIG. 2 shows a section view along line II—II of FIG. 1.

FIGS. 3 and 4 show a schematic view of some joint devices according to the invention.

FIGS. 5 and 6 show two examples of the application of the joint devices according to the present application in case of assemblage of a sofa and table, respectively.

Referring now to FIGS. 1 and 2, the invention provides an element 1 formed of metallic material, strengthened plastics or other technologically suitable materials, by diecasting, in the form of a channel having a size adapted to receive a construction element, such as a panel, board, strip or like.

Inside of the channel there are provided one or more locking elements consisting of cone shaped pins 3 forming one body with said channel. In the embodiment shown in FIGS. 1 and 2 the channel 1 has a pair of parallel wings 4, into which a second construction element 5 may be inserted. The use of the device is very simple: it is sufficient to insert the channel 1 onto the edge of a panel 2 and push it until the pins 3 wholly enter the panel 2.

In FIGS. 3 and 4 there are shown several examples of the joint devices. The device A connects two panels with one another to form a single continuous panel, the device B has a side seat whereas the device C has two opposite symmetrical side seats. In FIG. 4 are shown devices D, E and F which allow connecting to one another at right angle two, three and four panels, respectively.

Obviously, there may be provided joint elements having other configurations and arrangements of the single seats.

FIGS. 5 and 6 show examples of the application of the above disclosed elements for assembling a sofa and a table. In said figures the joint elements bear the respective reference letters and the element indicated with G is the same as shown in FIGS. 1 and 2.

The device according to the present invention obviously is not limited to the construction of furniture, but may be employed in several other assemblage fields.

The present invention has been disclosed in a preferred embodiment thereof, but it will be understood that several constructive modifications may be brought thereto by one skilled in the art without departing from the scope of the present industrial privilege.

Having thus described the present invention, what is claimed is:

1. A connecting joint seat member device comprising a base wall; at least one pair of side walls, the side walls of any pair extending perpendicularly from said base wall and parallel with each other in side-by-side relationship; said base wall and each pair of said side walls defining a channel adapted to receive a construction panel member; and at least two conical locking projections, each locking projection formed integrally with said base wall, extending parallel with a pair of said side walls and within the channel defined by said last-named pair of side walls and adapted to penetrate and hold a construction panel member received in that channel.

2. A device as claimed in claim 1 further comprising a second base wall formed coextensive and integral with one wall of one of said pairs of side walls; a further pair of side walls extending perpendicularly from said second base wall and parallel with each other in side-by-side relationship; said second base wall and said further pair of side walls defining a second channel adapted to receive a second construction panel member; and a further conical locking projection formed integrally with said second base wall, extending parallel with said further pair of side walls and within the second channel, and adapted to penetrate and hold a construction panel member received in the second channel.

* * * * *